United States Patent
Holcomb

(10) Patent No.: US 6,418,786 B1
(45) Date of Patent: Jul. 16, 2002

(54) AIRCHECK SAFETY VALVE

(76) Inventor: Larry W. Holcomb, Rte. 2, Box 189D, Johnston, SC (US) 29832

( * ) Notice: Subject to any disclaimer, the term of this patent is extended or adjusted under 35 U.S.C. 154(b) by 0 days.

(21) Appl. No.: 09/430,223

(22) Filed: Oct. 29, 1999

Related U.S. Application Data

(63) Continuation-in-part of application No. 09/170,291, filed on Oct. 13, 1998, now Pat. No. 5,979,232.

(51) Int. Cl.⁷ .............................................. B60C 23/02
(52) U.S. Cl. .................................................... 73/146.8
(58) Field of Search .................. 73/146, 146.2, 73/146.8, 146.5, 146.4, 146.3; 116/34 R

(56) References Cited

U.S. PATENT DOCUMENTS

| | | | | |
|---|---|---|---|---|
| 3,670,688 A | * | 6/1972 | Seaberg | 116/34 |
| 4,426,881 A | * | 1/1984 | Magoulick | 73/146.8 |
| 4,539,005 A | * | 9/1985 | Greenblatt | 604/141 |
| 4,539,928 A | | 9/1985 | Todhunter et al. | 116/34 R |
| 4,819,686 A | * | 4/1989 | Achterholt | 137/229 |
| 5,014,643 A | | 5/1991 | Huang | 116/34 R |
| 5,103,670 A | | 4/1992 | Wu et al. | 73/146.8 |
| 5,503,012 A | | 4/1996 | Rabizadeh | 73/146.8 |
| 5,569,849 A | | 10/1996 | Cummings | 73/146.8 |
| 5,606,123 A | | 2/1997 | Rabizadeh | 73/146.8 |
| 5,641,902 A | | 6/1997 | Hong | 73/146.8 |
| 5,687,672 A | | 11/1997 | Gabriel | 116/34 R |
| 5,720,728 A | * | 2/1998 | Ford | 604/131 |
| 5,979,232 A | | 11/1999 | Holcomb | 73/146.8 |

* cited by examiner

*Primary Examiner*—Benjamin R. Fuller
*Assistant Examiner*—Abdullahi Aw-Musse
(74) *Attorney, Agent, or Firm*—Womble Carlyle Sandridge & Rice, PLLC

(57) ABSTRACT

A tire pressure indicator carried on a tire being monitored for inflation pressure. The indicator includes a housing enclosing an indicating member bearing color coding corresponding to proper inflation. Preferably, additional color coding is provided corresponding to excessive tire pressure and to low or inadequate tire pressure. The indicating member occupies a chamber and air pressure from the tire acting on the indicating member, and is moved in response to tire pressure such that the appropriate color coding is revealed through a window formed in the housing.

11 Claims, 4 Drawing Sheets

AIRCHECK SAFETY VALVE

RELATED APPLICATION

The present application is a continuation in part application of U.S. patent application Ser. No. 09/170,291, filed on Oct. 13, 1998, now U.S. Pat. No. 5,979,232, issued on Nov. 9, 1999.

BACKGROUND OF THE INVENTION

1. Field of the Invention

The present invention relates to pressure gauges of the type carried on a vessel being monitored. More particularly, the invention relates to a mechanical indicator of pneumatic pressure which indicates by color coding whether the pressure being monitored is within specifications. In alternative embodiments, the novel indicator cooperates with or is an integral part of a valve enabling the vessel to be filled with compressed gas.

2. Description of the Prior Art

Pneumatic tires are designed to operate at pressures within narrow predetermined ranges. Typically, tires lose pressure and must be reinflated to specified values by the operator. This maintenance operation requires a pressure gauge. Many operators rely upon service facilities offering compressed air to supply the gauge. If the service facility does not supply a gauge, the operator of the vehicle is obliged to furnish the gauge. It is easy to neglect to bring a tire pressure gauge at all times, and the operator may therefore lack a gauge when desiring to restore or check tire pressure. Even if a pressure gauge is at hand, it is not always convenient to utilize typical tire pressure gauges. Pressure gauges are normally designed to operate when pressed against the valve of the tire sufficiently to release pressure so that it may be measured and indicated. Under conditions of severe temperatures, dust, rain, and other influences, it may prove difficult or unpleasant to check tire pressure.

One answer to this problem is to furnish a pressure gauge that is left in place on the tire, the gauge having an indicator which may be readily viewed to ascertain tire pressure. Such gauges have been proposed in the prior art.

In an indicator shown in U.S. Pat. No. 5,569,849, issued to Craig Cummings on Oct. 29, 1996, a colored liquid flows around a solid member obstructing view of the colored liquid when tire pressure deviates from a predetermined setpoint. Visibility of the colored liquid indicates inadequate pressure. By contrast, in the present invention, a solid colored member aligns with a window formed in the indicator. In the novel indicator, air pressure from the tire acts directly on the solid member. No fluid apart from compressed air contained in the tire is employed.

U.S. Pat. No. 5,103,670, issued to Min-Yu Wu et al. on Apr. 14, 1992, shows an indicator having a bellows operated piston which, when appearing in a window formed in the indicator, aligns with indicia indicating pressure values. By contrast with this approach, the present invention exposes indicia, preferably in the form of a predetermined color, which enables immediate discernment of whether pressure is within specifications. There are no bellows in the present invention.

U.S. Pat. Nos. 5,503,012 and 5,606,123, issued to Masoud Rabizadeh respectively on Apr. 2, 1996, and Feb. 25, 1997, both are based on a ball visible through a window which aligns with indicia. Rabizadeh improves on prior art devices by providing a magnifying glass over the window. However, graduation indicia must still be read in order to determine pressure within the tire. In the present invention, mere discernment of color is required to obtain the same information. There is no magnifying glass required in the present invention.

The subject indicator shown in U.S. Pat. No. 5,641,902, issued to Jung Un Hong on Jun. 24, 1997, incorporates an inflatable member which displays indicia indicating inflation pressure. By contrast, in the present invention, a color signal is visible through a window to indicate tire pressure. There is no inflatable member in the present invention.

None of the above inventions and patents, taken either singly or in combination, is seen to describe the instant invention as claimed.

SUMMARY OF THE INVENTION

The present invention enables a vehicle operator to determine sufficiency of tire pressure at a glance. There is no necessity of pressing an instrument against the valve. It is not even necessary that the indicator be fully visible and unobscured, since any glimpse of a predetermined color immediately conveys the sought information. Therefore, minor accumulation of dust and dirt, which are normally present under driving conditions, would usually not affect function of the invention.

The invention comprises a tubular housing or body which protrudes inwardly radially from a wheel, in the usual location of filling valves for pneumatic tires. It has a window revealing an indicating member which is color coded to indicate tire pressure relative to predetermined pressure values. The indicating member has colors signifying excessive pressure, proper pressure, and low pressure. The user will determine at the state of inflation of the tire at a glance.

The novel indicator may be fabricated to mount to conventional filling valves by a threaded attachment. Alternatively, it may be configured to supersede the usual filling valve. In either form, the novel indicator is carried on the tire being monitored for pneumatic pressure after installation, and need not be removed. The novel indicator is optionally configured to enable inflation in the usual manner without removing the indicator from the valve or tire.

Accordingly, it is a principal object of the invention to provide a tire pressure indicator that is carried on a tire being monitored.

It is another object of the invention that the novel indicator provide visual indication of whether the pressure is within specifications by color coding.

It is a further object of the invention to indicate high and low pressure conditions as well as proper inflation pressures.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
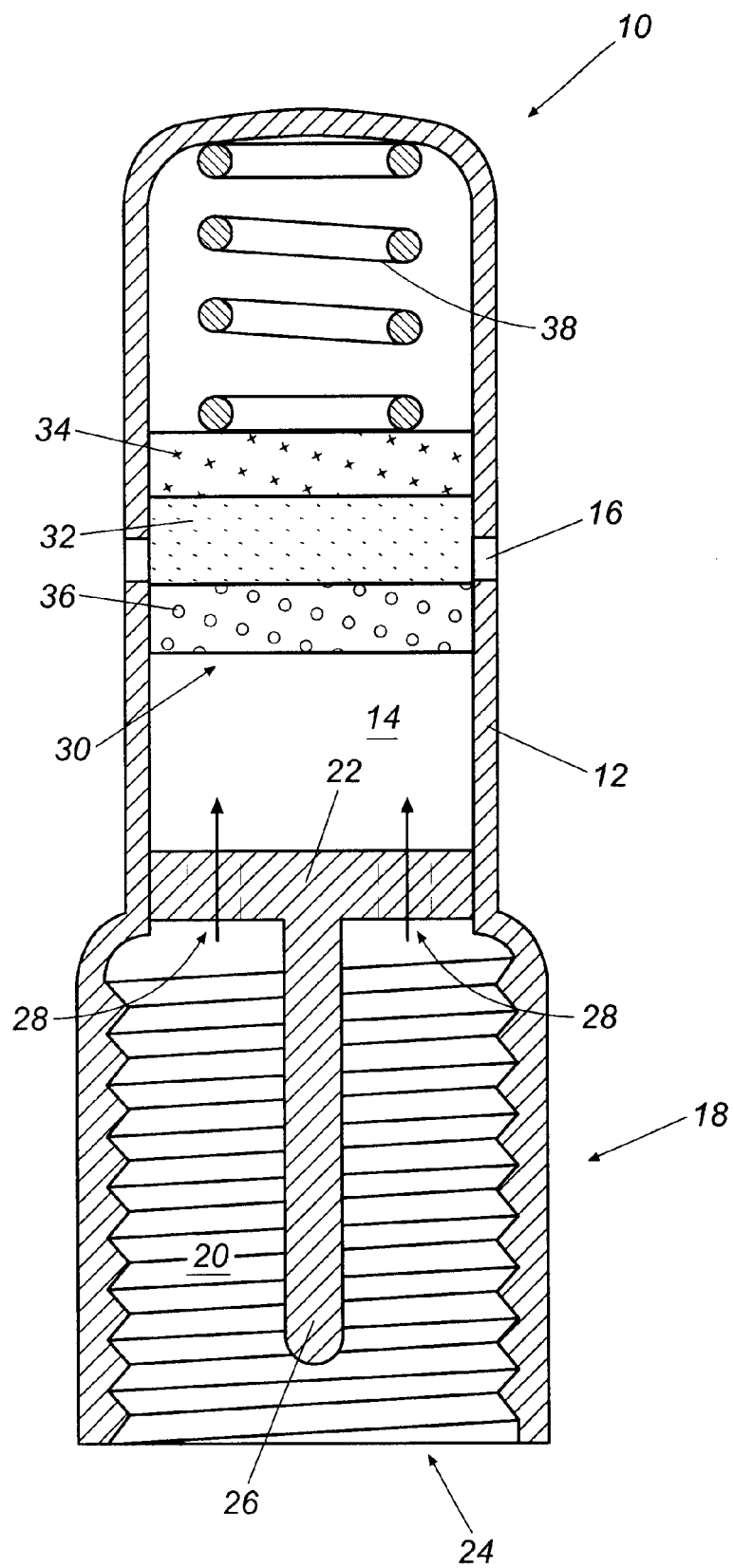
FIG. 1 is a side cross sectional view of one embodiment of the invention.

FIG. 1 of the drawings illustrates an embodiment of the invention adapted to be installed on a conventional filling valve stem (not shown) of a pneumatic tire. In this embodiment, tire pressure indicator 10 comprises a generally cylindrical housing 12 having an inner chamber 14 and a window 16 exposing inner chamber 14 to the exterior of housing 12. Housing 12 is fabricated from a suitable strong, opaque material, such as metal or a synthetic resin. Window 16 is solid rather than open, but is formed from a transparent material. Window 16 closes inner chamber 14 so that external air pressure cannot influence events occurring within inner chamber 14 responsive to tire pressure. In the embodiment of FIG. 1, window 16 forms a transparent circumferential band encircling inner chamber 14, so that the interior is visible from the side of indicator 10 in any direction.

A connecting portion or connector 18 is formed at the lower end of inner chamber 14. Connector 18 extends housing 12, and bears threads 20 enabling indicator 10 to be threaded to the threads of the filling valve stem (not shown). A wall 22 is formed at the bottom of chamber 14. An air passage 24 formed in connector 18 establishes pneumatic communication between chamber 14 and air generating pressure within the tire.

A projection 26 for depressing the valve of the filling valve assembly depends from wall 22. Wall 22 also has openings 28 to conduct air pressure from air passage 24 into chamber 14.

An indicating member 30 is slidably disposed within chamber 14, and is arranged to pass by window 16. Indicating member 30 has a first external area designated at 32 colored with a first predetermined hue for indicating proper pressure within the tire, a second external area designated at 34 colored with a second predetermined hue, and a third external area designated at 36 colored with a third predetermined hue. Colored areas 32, 34, 36 provide color coding visible through window 16 to indicate the state of inflation of the tire relative to predetermined ranges of pressure preferred by the tire or vehicle manufacturer. Preferably, proper inflation is signaled by green, which conventionally is associated with an operative condition. Excessive pressure is signaled by red, and inadequate or low pressure is signaled by yellow.

Indicating member 30 is acted on by two opposing forces. Pneumatic pressure from the tire is conducted through passage 24 and openings 28 so that it urges member 30 upwardly, as depicted in FIG. 1. A compression coil spring 38 of predetermined spring rate is disposed within chamber 14 on that side of indicating member 30 opposite the side exposed to tire pressure. Indicating member 30 moves within chamber 14 responsive to differential in force between spring force of spring 38 and pneumatic pressure conducted from the tire to chamber 14. As indicating member 30 moves responsively to the two forces, an appropriate colored area 32, 34, or 36 aligns with window 16, and is visible from the outside. The spring rate is selected such that colored area 32 aligns with and is visible through window 16 when tire pressure is within the acceptable range, area 34 aligns with window 16 when tire pressure is excessive, and area 36 aligns with window 16 when tire pressure is too low.

In this scheme of operation, pressure of the tire is indicated relative to a predetermined range of pressures, and is not directly measured. In operation of most vehicles having pneumatic tires, it is really not necessary to establish the actual pressure, but merely to know whether the tire pressure is within an acceptable range of pressures. Reading indicator 10 is easier than attempting to discern indicia indicating numerical values of actual pressures, since such indicia is likely to become obscured by dirt and dust as the vehicle is used. It is also not necessary to correlate a measured numerical value to values of the acceptable range of pressures.

Figure 2:
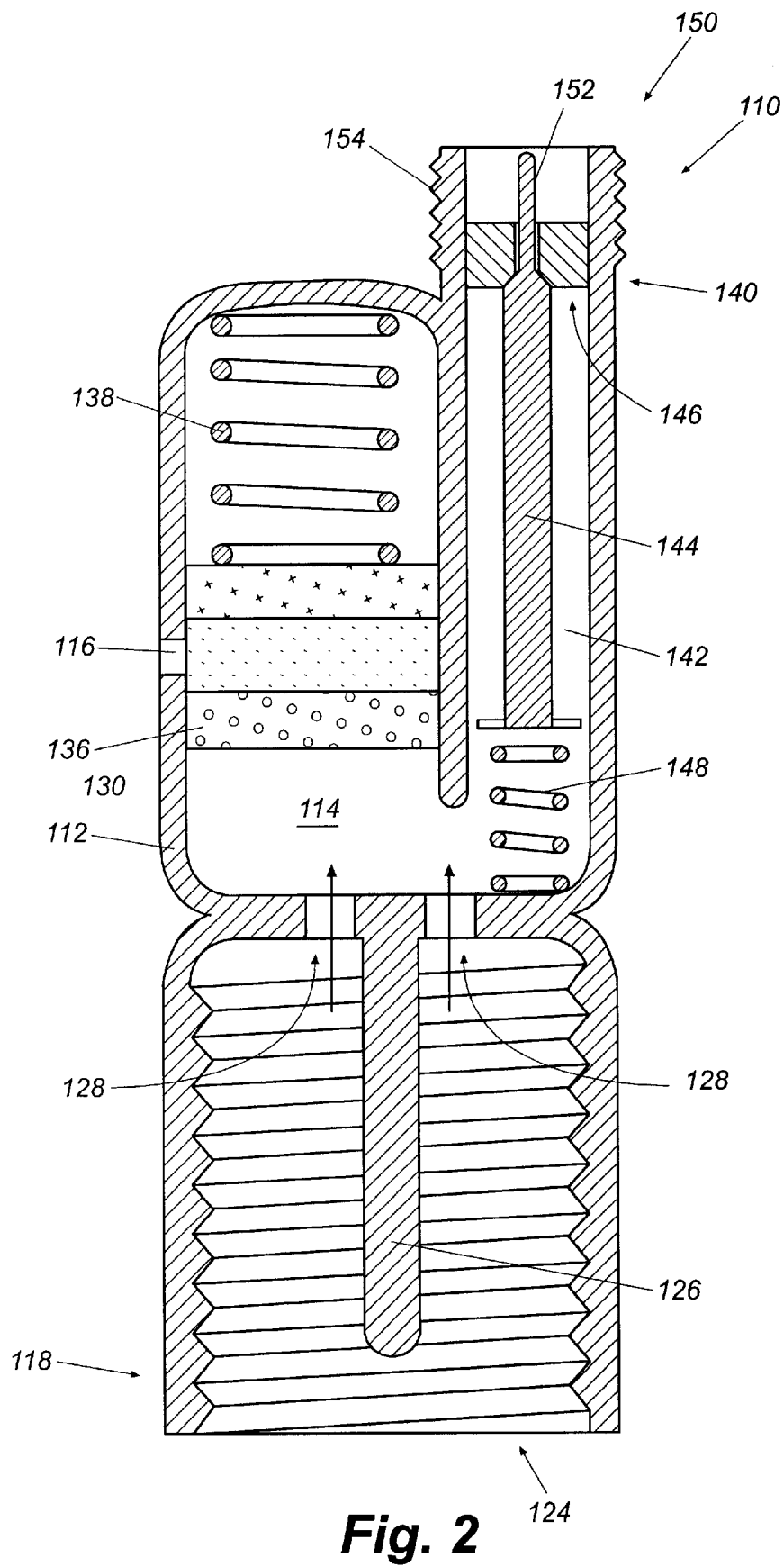
FIG. 2 is a side cross sectional view of a second embodiment of the invention.

FIG. 2 illustrates a second embodiment of the invention which provides the features of the embodiment of FIG. 1, and adds a feature enabling the tire to be charged with compressed gas without removing the novel tire pressure indicator from the tire. In the embodiment of FIG. 2, tire pressure indicator 110 includes a housing 112 and a connector 118 both functioning in a manner similar to their counterparts of the embodiment of FIG. 1. An indicating member 130 bearing three colored areas 132, 134, 136 is slidably disposed within chamber 114 such that the colored areas 132, 134, 136 become visible through window 116 formed in housing 112. A spring 138 opposes force applied by pneumatic pressure conducted from a tire (not shown) through connector 118 into chamber 114. These components are functional counterparts of similar components shown and described with reference to FIG. 1, and therefore need not be further described herein.

Indicator 110 has a bypass conduit 140 disposed in pneumatic communication with air passage 124 of connector 118. Bypass conduit 140 has a passageway 142, which contains a check valve 144. Check valve 144 closes passageway 142 at a valve seat 146. A spring 148 urges check valve 144 against seat 146. Force of spring 148 is readily overcome when an air chuck (not shown) or other apparatus for charging the tire with compressed gas is placed over the upper end 150 of bypass conduit 140. Preferably, upper end 150 is configured similarly to corresponding parts of a conventional filling valve assembly, so that bypass conduit 140 may be connected to conventional air replenishing apparatus (not shown). To this end, cheek valve 144 has a projection 152 enabling depression of check valve 144 when an air chuck is fitted to bypass conduit 140. Threads 154 enable a threaded cap (not shown) to be attached to upper end 150 to protect check valve 144 and its seat 146 from contamination. Passageway 142 opens to air passage 124 so that freshly introduced pressurized gas both fills the tire and also acts on indicating member 130.

Figure 3:
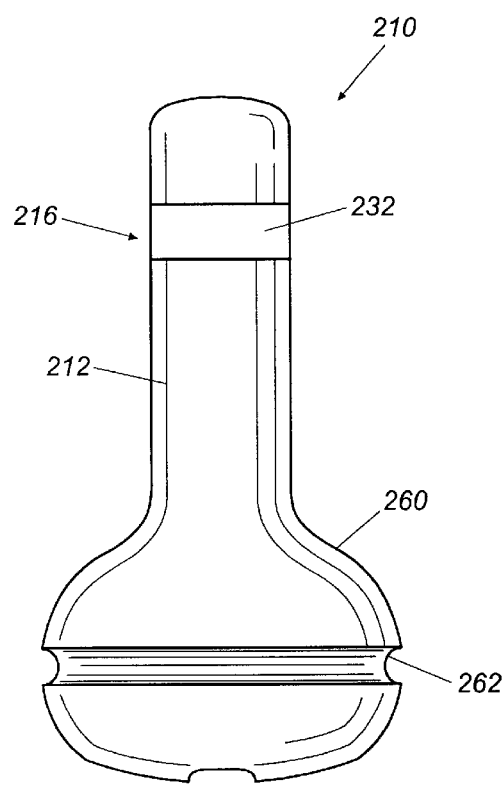
FIG. 3 is a side elevational view of a third embodiment of the invention.

Thus far, the invention has been described in terms of being connected to a conventional filling valve assembly. In another embodiment of the invention, referring now to FIG. 3, novel indicator 210 is configured to supersede the conventional filling valve entirely, being fitted to a metallic wheel in place of the conventional filling valve assembly. Indicator 210 includes the functional components of, selectively, indicator 10 and 110, and further includes a resilient bulb 260 bearing a groove 262. Bulb 260 is dimensioned and configured to seat within an opening (not shown) formed in conventional wheels for receiving conventional filling valve assemblies. Bulb 260 and groove 262 collectively provide structure connecting housing 212 directly to the wheel (not shown) on which the tire is mounted. In the embodiment of FIG. 3, the connecting structure cooperates with the wheel both to mount indicator 210 securely to the wheel and also to establish an air passage establishing pneumatic communication between said inner chamber and air generating pressure within the tire.

Figure 4:
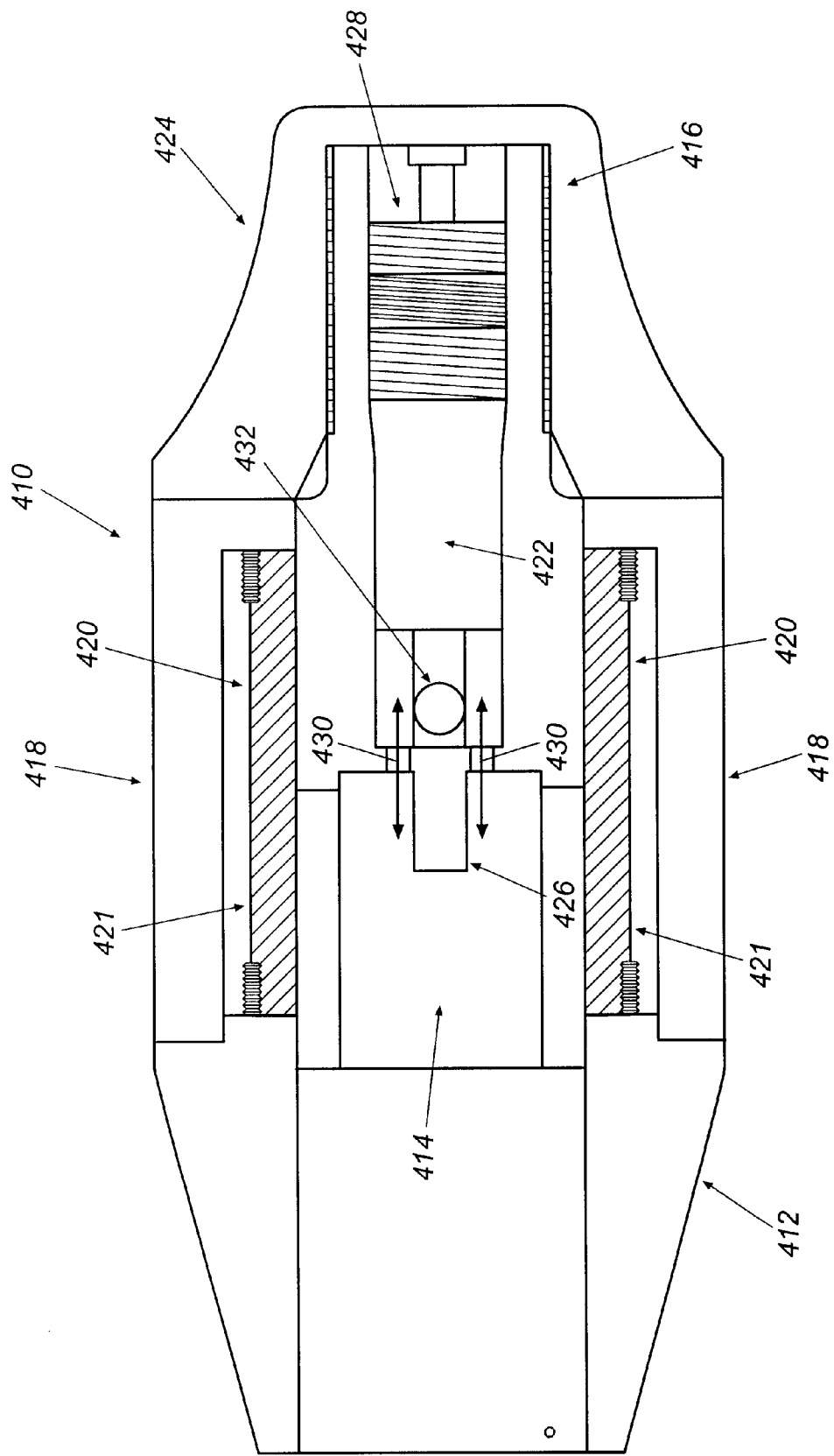
FIG. 4 is a side elevational view, taken in partial cross section, of a fourth embodiment of the invention.

FIG. 4 illustrates a further embodiment of the indicator of the present invention, indicated generally at 410. The indicator 410 generally includes a body 412 with a coupling chamber 414 formed in one end and a coupling nozzle 416 formed in an opposed end. A viewing window 418 defining an inner chamber 420 between the window 418 and the body 412 is positioned at an intermediate point along the body between its opposite ends. A flexible, resilient bladder 421 is positioned in the inner chamber 420 within a center cavity indicated by 422, formed within the body 412, and generally being connected to the coupling member 414 and the coupling nozzle 416. Optionally, a cap 424 can be applied to the body 412 over the coupling nozzle 416.

The body 412 generally is built from a durable plastic material such as a polycarbonate or similar material. The viewing window 418 is preferably made from a semitransparent plastic material and enables a visual inspection of the bladder 421 from the exterior of the body 412. The flexible bladder 421 acts as an indicating member and generally is made from a resilient, inflatable material so as to expand as pressurized air/gas from the tire is applied thereto. The bladder generally is out of contact with the viewing window 418 when not inflated, but as pressure is applied from the tire, the flexible bladder 421 is inflated and will expand into engagement contact with the viewing window 418.

The flexible bladder 421 further generally is colored with a predetermined hue, i.e. green, blue, etc. The coupling member 414 further has a projection 426 that is threaded internally to receive a standard filler valve (not shown). The coupling nozzle 416 also typically is threaded externally to receive compressed gas supply or additional pressure measuring devices (not shown) connected thereto. The center cavity 422 is fitted with a commercially available valve core 428 to support a standard interface to a compressed gas supply or pressure measuring devices through the coupling nozzle 416. The center cavity 422 connects to the coupling member 414 through a plurality of air passages 430 and to the inner chamber 420 through an air channel 432.

When the indicator 410 is coupled onto a filler valve (not shown) through the coupling member 414, projection 426 depresses the internal valve (not shown) and allows compressed air to flow into the center cavity 422 through air passages 430. The compressed air flows through the channel 432, inflating the bladder 421 to a selected or predetermined pressure. As this pressure is reached, the bladder 421 is inflated and expands into engaging contact with the viewing window 418. The predetermined hue of the bladder 421 enables the bladder to become clearly visible through the viewing window 418 once it has been inflated into contact with the viewing window 418. If the air pressure is not sufficient, the bladder 421 will not be fully expanded/moved into contact with the viewing window 418, and thus will not be clearly visible through the viewing window 418. The refilling of an air chamber such as a pneumatic tire thus can be accomplished without removing the indicator 410 from the valve, simply by removing the cap 424 and connecting a compressed air supply onto the coupling nozzle 416.

Figure 5:
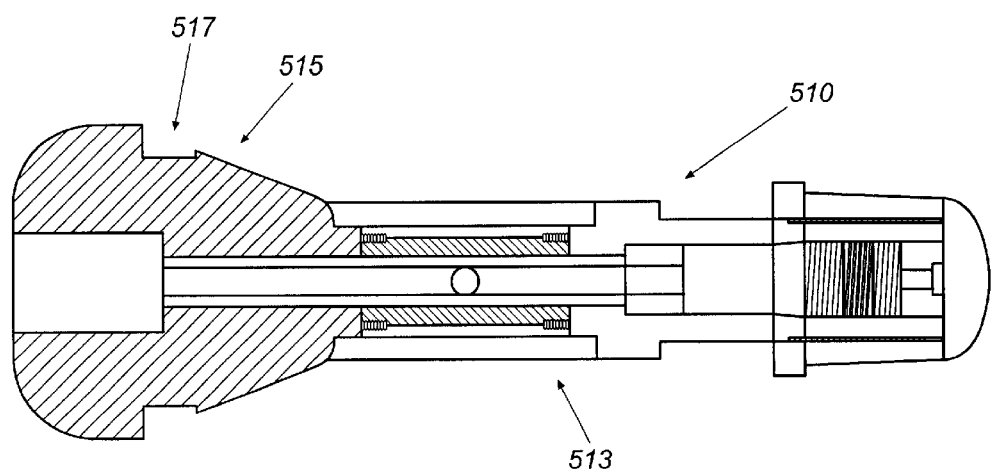
FIG. 5 is a side elevational view, taken in partial cross section, of a fifth embodiment of the invention.

FIG. 5 illustrates still a further embodiment of the indicator 510 that is configured to fit to a metallic wheel in place of the conventional filling valve assembly. The indicator 510 generally includes the functional components of, selectively, indicator 10, 110 and 410, and further includes a resilient bulb 515 having a groove 517. The bulb 515 is dimensioned and configured to seat within an opening (not shown) formed in conventional wheels for receiving conventional filling valve assemblies. Bulb 515 and groove 517 collectively provide a structure for connecting housing 513 directly to the wheel (not shown) on which the tire is mounted. In the embodiment of FIG. 5, the connecting structure cooperates with the wheel both to mount the indicator 510 securely to the wheel and also to define an air passage for establishing pneumatic communication between said inner chamber and air generating pressure within the tire.

The present invention is susceptible to modifications and variations, which may be introduced without departing from the inventive concept. For example, threads 20, 120 or the coupling member 414 securing indicator 10, 110 or 410 to the filling valve assembly may be modified to enable manual connection to the wheel in another manner, so long as manual connection and removal is enabled. The invention may be modified to attach directly to the tire or to an inner tube (not shown) associated with the tire. For example, the invention may be fabricated integrally with tires and rubber tubes, if desired.

It is also understood that the present invention is not limited to the embodiments described above, but encompasses any and all embodiments within the scope of the following claims.

I claim:

1. A tire pressure indicator for indicating pressure within a tire, comprising:
   a body having a center cavity and a coupling chamber that establishes constant pneumatic communication between said center cavity and air generating pressure within a tire when said indicator is coupled to the tire;
   a viewing window positioned along said body; and
   an expandable, resilient indicating member disposed within said center cavity and being expanded by said air, said resilient indicating member being in contact with said window and being clearly visible through said window when said air is of a pressure at least equal to a predetermined pressure, said resilient indicating member being out of contact with said window and not being visible through said window when said air is of a pressure below said predetermined pressure.

2. The tire pressure indicator of claim 1, and further comprising an inner chamber within said center cavity and a channel that establishes pneumatic communication between said center cavity and said inner chamber, wherein said resilient indicating member is disposed within said inner chamber.

3. The tire pressure indicator of claim 1, and wherein said resilient indicating member is colored with a predetermined hue.

4. The tire pressure indicator of claim 1, and wherein said window is at least partially transparent.

5. A tire pressure indicator mountable on a pneumatic wheel and tire assembly, for indicating pressure within a tire, comprising:
   a body having a center cavity and a coupling chamber end that couples said indicator to a tire such that air generating tire pressure within said tire automatically flows to said center cavity when said indicator is mounted on said tire;
   a viewing window positioned along said body; and an inflatable indicating member disposed within said center cavity, said inflatable indicating member being inflated by said air such that said inflatable indicating member is spaced from said window if said tire pressure is below a predetermined pressure, and such that said inflatable indicating member is in contact with said window if said tire pressure is at least equal to said predetermined pressure.

6. The tire pressure indicator of claim 5, and further comprising at least one air passage connecting said center cavity to said coupling chamber end.

7. The tire pressure indicator of claim 5, and wherein said coupling chamber further comprises a projection for depressing a connecting valve.

8. The tire pressure indicator of claim 5, and wherein said window is at least partially transparent.

9. A tire pressure indicator comprising:

a body having an inner chamber and a window exposing said inner chamber to the exterior of said body;

an indicating member slidably disposed within said inner chamber, said indicating member having a first area colored with a first predetermined hue for indicating proper pressure within the tire, a second area colored with a second predetermined hue for indicating excessive pressure within the tire, and a third area colored with a third predetermined hue for indicating low pressure within the tire;

a coupling member disposed to connect said body to a wheel on which the tire is mounted, said coupling member having an air passage for establishing pneumatic communication between said inner chamber and air generating pressure within the tire, whereby said tire pressure indicator is mounted to a filling valve through said coupling member, and wherein said tire pressure indicator includes a projection that depresses the filling valve when said tire pressure indicator is placed on the filling valve such that pneumatic communication between the tire and said air passage of said coupling member is maintained when said tire pressure indicator is mounted on the filling valve of the tire; and a coil spring of predetermined spring rate disposed to move slidably said indicating member longitudinally within said inner chamber responsive to pressure conducted through said air passage such that said first area colored with a first predetermined hue becomes visible through said window when pressure within the tire is in a predetermined range of pressures, said second area becomes visible through said window when pressure within the tire is above the predetermined range of pressures, and said third area becomes visible through said window when the pressure within the tire is below the predetermined range of pressures, wherein said coil spring is disposed within said inner chamber on one side of said indicating member, and said air passage of said coupling member is disposed on an opposing side of said indicating member, and whereby said indicating member moves within said inner chamber responsive to a differential in force between spring force of said compression coil spring and pneumatic pressure conducted from the tire to said inner chamber.

10. A method of automatically checking pressure in a tire comprising:

placing a tire pressure indicator onto a valve of a tire, said indicator having a body and a viewing window positioned along said body, said body including a coupling chamber and a cavity connected to said coupling chamber, said cavity including an inflatable indicating member;

connecting said coupling chamber to said valve;

automatically flowing air generating tire pressure within said tire from said tire into said coupling chamber when said coupling chamber is coupled to said valve;

flowing said air from said coupling chamber to said cavity;

inflating said inflatable indicating member with said air;

observing the window for a presence of the resilient member against the window;

determining that said tire pressure is below a predetermined pressure if the inflatable indicating member is not observed against the window; and determining that said tire pressure is at least equal to the predetermined pressure if the inflatable indicating member is observed against the window.

11. The method of automatically checking tire pressure of claim 10, further comprising the steps of:

applying said predetermined pressure to said inflatable indicating member; and expanding said inflatable indicating member into contact with the window.

* * * * *